H. M. YORKE.
DENTIST'S IMPLEMENT.
APPLICATION FILED OCT. 9, 1909.
969,682.
Patented Sept. 6, 1910.
Fig. 1.
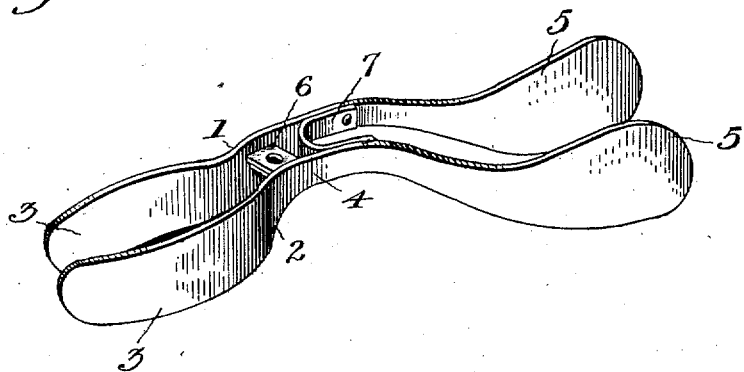
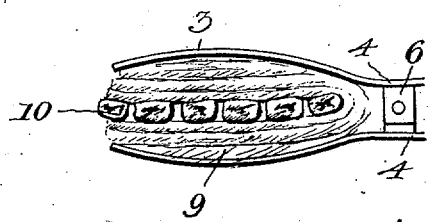
Fig. 2.
Witnesses
K. Delabar
Frederick Fox
Inventor
Horace M. Yorke
By Victor J. Evans
Attorney

UNITED STATES PATENT OFFICE.

HORACE M. YORKE, OF FREEPORT, MAINE.

DENTIST'S IMPLEMENT.

969,682.   Specification of Letters Patent.   Patented Sept. 6, 1910.

Application filed October 9, 1909. Serial No. 521,855.

*To all whom it may concern:*

Be it known that I, HORACE M. YORKE, a citizen of the United States, residing at Freeport, in the county of Cumberland and State of Maine, have invented new and useful Improvements in Dentists' Implements, of which the following is a specification.

The invention relates to an improved implements for dentists' use, being more particularly directed to a holder for a napkin or similar absorbent material, so constructed that such material may be applied adjacent a tooth being filled or treated to prevent the accumulation of saliva about or in the tooth.

The main object of the present invention is the provision of an implement in which absorbent or an ordinary napkin may be inserted and positioned relative to the teeth so as to protect a particular tooth being treated from saliva, the construction of the implement causing it to be retained in set position after application without requiring further attention on the part of the operator.

The invention will be described in the following specification, reference being had particularly to the accompanying drawing, in which:—

Figure 1 is a perspective view of the improved implement. Fig. 2 is a partial plan illustrating the application of the implement.

Referring particularly to the accompanying drawing, wherein is shown the preferred details of construction, the improved implement is made up of duplicate members 1 and 2. Each member includes a jaw portion 3, a shank portion 4 and a handle portion 5, the member being preferably constructed of sheet material of sufficient rigidity for the purpose designed. The jaw portion is curved throughout its length in side elevation, and also in plan or top edge view, and is relatively broad, being thus adapted to conveniently fit alongside the teeth. The shank portion is preferably curved in side elevation, as shown, to permit the application of the implement over the lips without unnecessarily depressing the same, and each shank is provided with an inwardly projecting lip 6, whereby the members may be pivotally connected through the medium of a pin uniting the lips. A leaf spring 7 is arranged between the handle portions 5 of the members and operates to normally maintain the jaws free in operative or gripping position.

In use a napkin or roll of absorbent material 9 is arranged between the jaws and applied by means of the implement to each side of the teeth 10 to protect a particular tooth from the entrance of saliva while undergoing treatment. The spring operates to maintain an effective pressure upon the absorbent material so as to hold the same in proper relation to the teeth without requiring further attention on the part of the operator.

The implement is of light material and adapted for convenient application in all situations where it is necessary to protect one or more teeth against the entrance of saliva during the dental operation.

I claim:—

A dental implement including two members, each of said members comprising a jaw portion curved in side elevation from the ends downwardly to the center and in edge view from the ends upwardly to the center, a curved shank projecting from one end of the jaw portion, and a handle projecting from the shank, a lip projecting inwardly from each shank adjacent its connection with the jaw, means for pivotally connecting the lips, and a bow spring terminally connected to the respective shanks in rear of the pivotal connection, said spring being tensioned to force the jaw portions of the members toward each other.

In testimony whereof I affix my signature in presence of two witnesses.

HORACE M. YORKE.

Witnesses:
 MINERVA B. GAMMAN,
 EARL A. BUCK.